(12) United States Patent
Ho et al.

(10) Patent No.: US 9,536,683 B2
(45) Date of Patent: Jan. 3, 2017

(54) TOUCH MODULE

(71) Applicant: Acer Incorporated, New Taipei (TW)

(72) Inventors: Hsin-Tsung Ho, New Taipei (TW);
Han-Tsung Shen, New Taipei (TW);
Chung-Jen Ho, New Taipei (TW);
Chih-Chun Liu, New Taipei (TW);
Chien-Yun Hsu, New Taipei (TW);
Yi-Mu Chang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 113 days.

(21) Appl. No.: 14/495,935

(22) Filed: Sep. 25, 2014

(65) Prior Publication Data
US 2015/0169117 A1  Jun. 18, 2015

(30) Foreign Application Priority Data
Dec. 16, 2013  (TW) .............................. 102146360 A

(51) Int. Cl.
*G06F 3/047* (2006.01)
*H01H 3/12* (2006.01)
*G06F 3/0354* (2013.01)

(52) U.S. Cl.
CPC ............ *H01H 3/12* (2013.01); *G06F 3/03547* (2013.01); *G09G 2300/04* (2013.01)

(58) Field of Classification Search
CPC ..... H01H 3/122; G06F 3/03547; G06F 1/1613
USPC ............... 361/679.01, 679.1, 679.18, 679.55
See application file for complete search history.

(56) References Cited

U.S. PATENT DOCUMENTS

| 4,394,553 | A | * | 7/1983 | Feil | ........................ | H01H 13/40 200/332 |
| 6,177,924 | B1 | * | 1/2001 | Bae | ........................ | G06F 1/1616 345/157 |
| 8,139,347 | B2 | * | 3/2012 | Chiang | ................... | G06F 1/169 361/679.18 |
| 2010/0103611 | A1 | * | 4/2010 | Yang | ..................... | G06F 1/1616 361/679.55 |
| 2015/0160750 | A1 | * | 6/2015 | Wu | ........................ | G06F 3/016 345/173 |
| 2015/0169005 | A1 | * | 6/2015 | Yanagida | ................ | G06F 1/169 345/173 |

* cited by examiner

*Primary Examiner* — Tuan T Dinh
*Assistant Examiner* — Mukund G Patel
(74) *Attorney, Agent, or Firm* — McClure, Qualey & Rodack, LLP

(57) ABSTRACT

A touch module is provided, including a hollow frame, a positioning member, and a touch unit. The positioning member includes a main body, an extending portion, and a U-shape structure. The extending portion is connected to the main body and fixed to the frame. The U-shape structure includes a contact portion and a pair of flexible arms. The flexible arms are connected to the main body, wherein the U-shape structure and the main body form a gap therebetween. The contact portion and the extending portion are disposed on opposite sides of the main body, wherein the contact portion is disposed between the two flexible arms. The touch unit is connected to the main body and forms a protrusion, wherein when a force is applied to the touch unit, the protrusion contacts the contact portion.

10 Claims, 7 Drawing Sheets

TOUCH MODULE

CROSS REFERENCE TO RELATED APPLICATIONS

This Application claims priority of Taiwan Patent Application No. 102146360, filed on Dec. 16, 2013, the entirety of which is incorporated by reference herein.

BACKGROUND OF THE INVENTION

1. Field of the Invention

The present invention relates to a touch module, and in particular to a touch module with a positioning member for assembly.

2. Description of the Related Art

Conventional notebook computers usually have touch panels, but the touch panels do not have any buttons for clicking. Therefore, how to design a touch panel with a click function that simulates the action of the button on a mouse becomes an important issue.

BRIEF SUMMARY OF THE INVENTION

The present invention provides a touch module, comprising a hollow frame, a positioning member, and a touch unit. The positioning member comprises a main body, an extending portion, and a U-shape structure. The extending portion is connected to the main body and fixed to the frame. The U-shape structure includes a contact portion and a pair of flexible arms. The flexible arms are connected to the main body, wherein the U-shape structure and the main body form a gap therebetween. The contact portion and the extending portion are disposed on opposite sides of the main body, wherein the contact portion is disposed between the two flexible arms. The touch unit is connected to the main body and forms a protrusion, wherein when an external force is applied to the touch unit, the protrusion contacts the contact portion.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
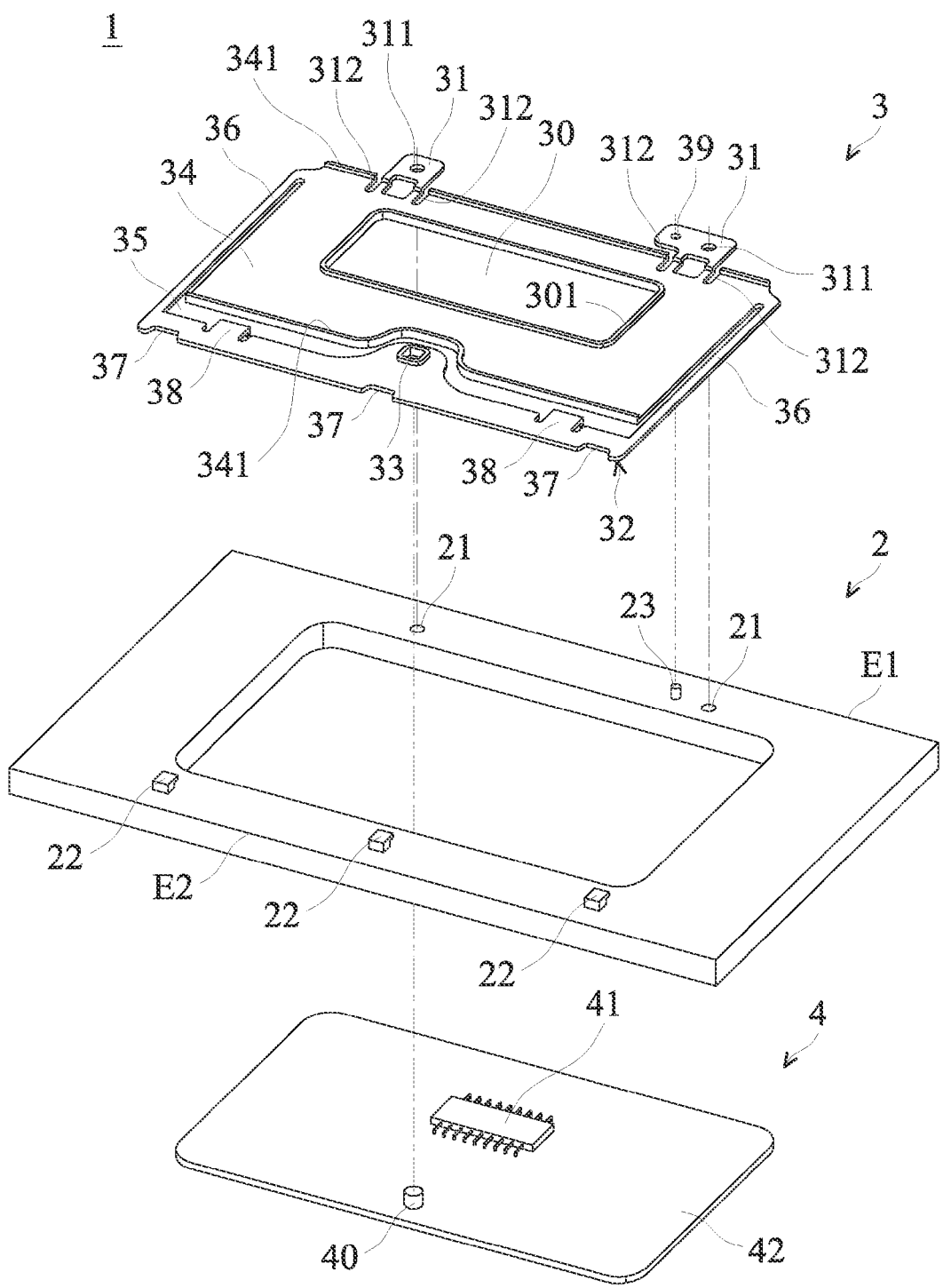
FIG. 1 is an exploded diagram of an touch module according to an embodiment of the invention.

Referring to FIG. 1, a touch module 1 in an embodiment of the present invention comprises a frame 2, a positioning member 3, and a touch unit 4. The hollow frame 2 has a first side E1 and a second side E2, wherein two locking holes 21 and a rod 23 are formed on the first side E1, and at least one hook 22 is formed on the second side E2. The touch unit 4 has a plate portion 42 with an electronic element 41 and a protrusion 40 disposed thereon. The positioning member 3 has two extending portions 31, a U-shaped structure 32, and a main body 34, wherein the extending portions 31 are connected to the main body 34 and respectively form a hole 311 corresponding to the locking hole 21, and one of the extending portions 31 further forms a through hole 39 corresponding to the rod 23 for positioning the frame 2 and the positioning member 3. The U-shaped structure 32 has a pair of flexible arms 36, a contact portion 33, and at least a recess 37, wherein the flexible arms 36 are connected to the main body 34, the contact portion 33 is disposed between the flexible arms 36, the U-shaped structure 32 and the main body 34 form a gap 35 therebetween, and the contact portion 33 and the extending portions 31 are disposed on opposite side of the main body 34.

Figure 2A:
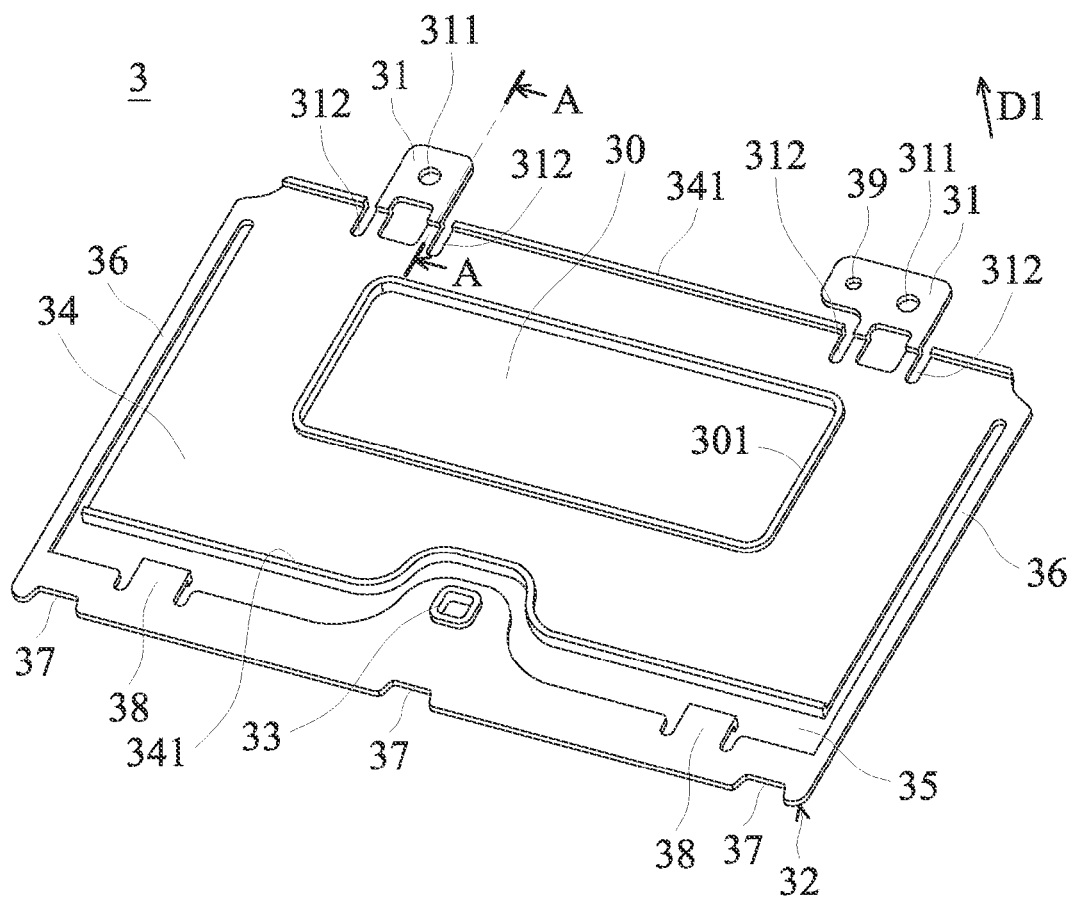
FIG. 2A is a schematic view showing a positioning member of the touch module according to an embodiment of the invention.
Figure 2B:
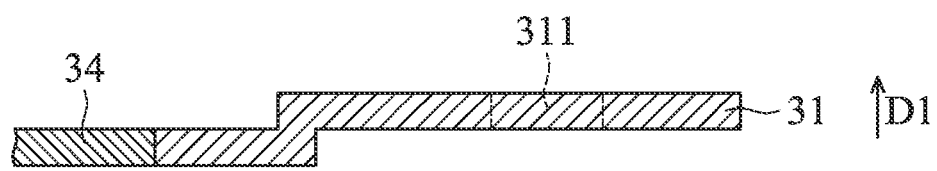
FIG. 2B is a sectional view along A-A of FIG. 2A.

Referring to FIGS. 2A and 2B, the extending portions 31 extend outward from the main body 34 along a longitudinal direction of the flexible arms 36, and respectively form a Z-shaped structure. Specifically, the extending portions 31 extend outward from the main body 34, and project along a first direction D1 (as shown in FIG. 2B), perpendicular to a main surface of the main body 34. Afterward, the extending portions 31 further extend toward the outside of the main body 34 along the longitudinal direction of the flexible arms 36 to form the Z-shaped structure, as shown in FIG. 2B. Two notches 312 are formed between the main body 34 and each of the extending portions 31, and the two notches 312 are disposed on opposite sides of each extending portion 31. Furthermore, the extending portions 31 may be drilled to form a hole to provide flexibility.

In this embodiment, the main body 34 further forms a first rib 301 and two second ribs 341 perpendicularly projecting from the main surface of the main body 34. The first rib 301 surround an opening 30 of the main body 34, and the second ribs 341 are formed at edges in opposite sides of the main body 34.

Figure 3:
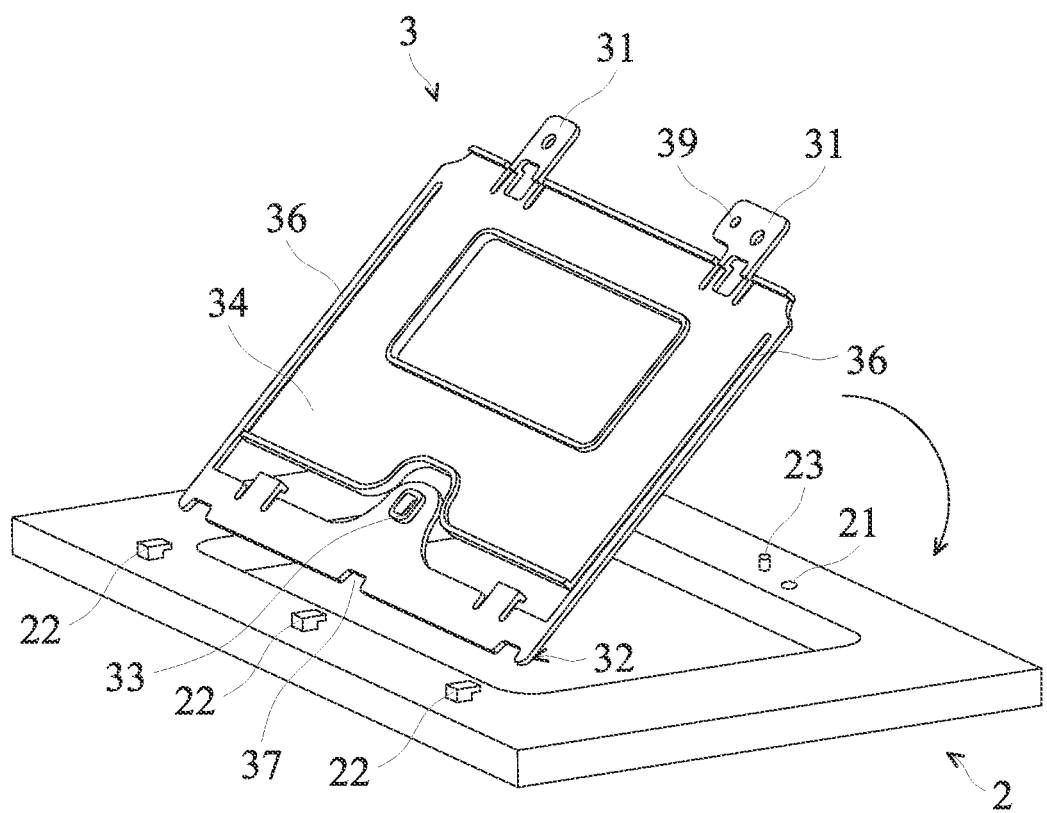
FIG. 3 is a schematic view showing the positioning member and a frame during assembly according to an embodiment of the invention.
Figure 4A:
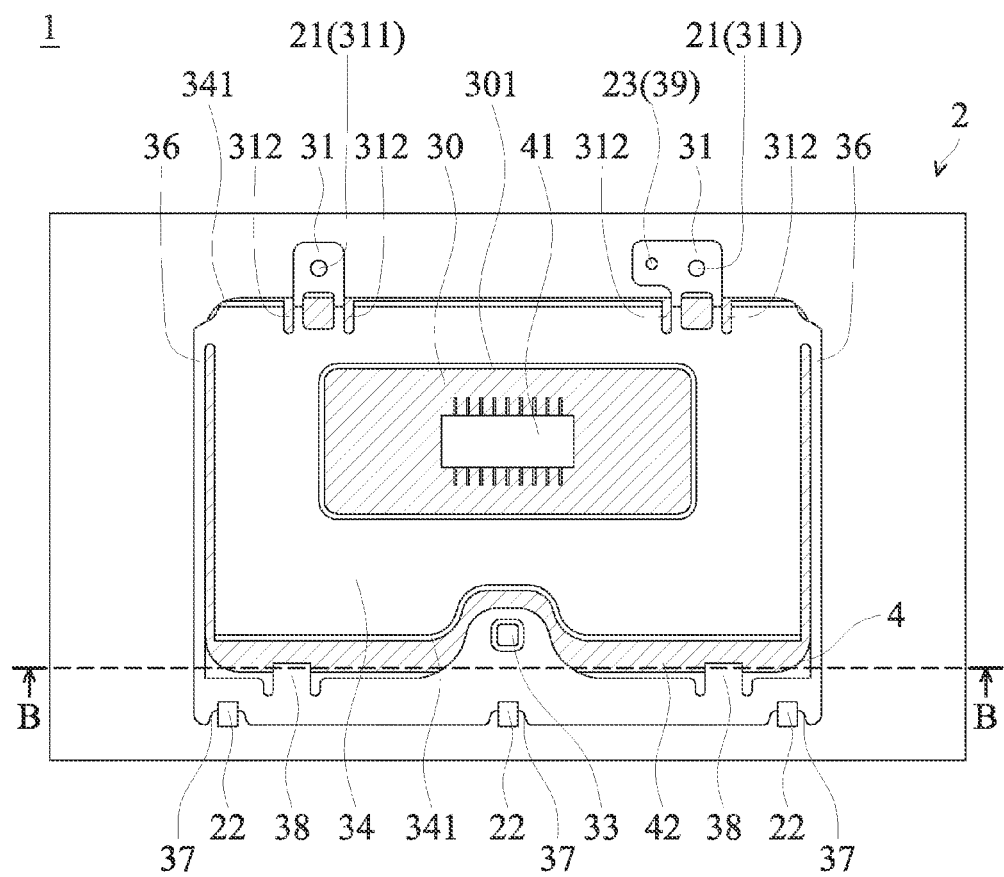
FIG. 4A is a schematic view showing the touch module after assembly according to an embodiment of the invention.

As shown in FIG. 3, during assembly of the touch module 1, the positioning member 3 is joined with the frame 2, the recess 37 of the positioning member 3 is engaged with the hook 22, and the positioning member 3 rotates relative to the frame 2 (as the arrow indicates in FIG. 3), such that the rod 23 passes through the through hole 39, and the hole 311 is aligned with the locking hole 21 for locking. Therefore, the positioning member 3 can be fixed in a predetermined position by the recess 37, the hook 22, the rod 23 and the through hole 39, such that the hole 311 can be aligned to the locking hole 21. Subsequently, as shown in FIG. 4A, the touch unit 4 is joined with the main body 34, and the electronic element 41 is received in the opening 30.

Figure 4B:
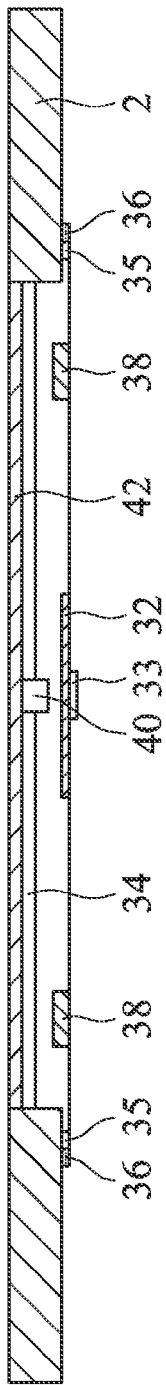
FIG. 4B is a sectional view along B-B of FIG. 4A.
Figure 4C:
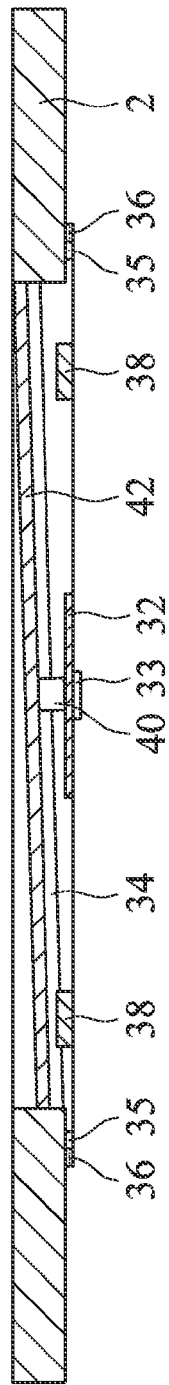
FIG. 4C is a schematic view showing a plate portion pressed by an external force according to an embodiment of the invention.

Referring to FIG. 3, as the extending portions 31 projecting from the main surface of the main body 34, the main body 34 and the U-shaped structure 32 may be located at different heights when the recess 37 of the U-shaped structure 32 and the extending portions 31 are engaged with the frame 2 (as shown in FIG. 4B), and the protrusion 40 of the touch unit 4 connecting to the main body 34 is a predetermined space apart from the contact portion 33 of the U-shaped structure 32. When an external force is applied to the plate portion 42 of the touch unit 4, as shown in FIG. 4C, such as a force applied to a corner of the plate portion 42, one of the extending portions 31 serves as a fulcrum and the other one of the extending portions 31 deforms, such that the main body 34 rotates slightly and pushes the protrusion 40 contacting the contact portion 33. When the external force is released, the main body 34 returns to the position as shown in the FIG. 4B by the elasticity of the flexible arms 36. Specifically, the predetermined space provides a predefined clicking stroke between the positioning member 3 and the touch unit 4. Therefore, the present invention can simplify the assembly of the touch module 1 by the positioning member 3 and the frame 2 to increase the efficiency of production. Furthermore, the tactile feeling can be improved to be consistent, and the idle stoke between the positioning member 3 and the touch unit 4 can be prevented.

Figure 4D:
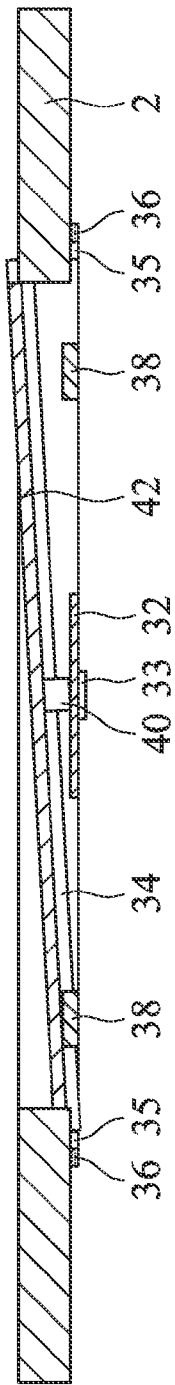
FIG. 4D is a schematic view showing a restricting portion contacting the plate portion according to an embodiment of the invention.

As shown in FIGS. 3, 4B and 4C, the U-shaped structure 32 has a pair of restricting portions 38, extending from the U-shaped structure 32 along a longitudinal direction of the flexible arms 36 and forming an L-shaped structure (as shown in FIG. 3). When an external force is applied to the plate portion 42 of the touch unit 4, the main body 34 is moved and drives the protrusion 40 contacting the contact portion 33. When an excessive force is applied, as shown in FIG. 4D, the restricting portions 38 contact the plate portion 42 to restrict movement of the plate portion 42, such that damage to the extending portions 31 or the flexible arms 36 caused by excessive deformation can be prevented. In some embodiments, the positioning member 3 can be integrally formed in one piece by punching, so as to simplify the assembly of the touch module 1.

Figure 5A:
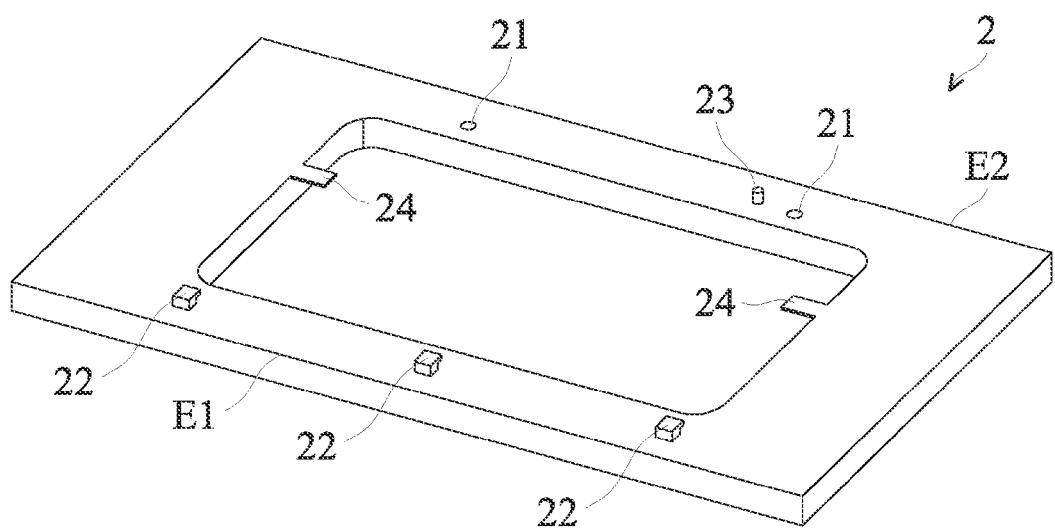
FIG. 5A is a schematic view showing a positioning member according to another embodiment of the invention.
Figure 5B:
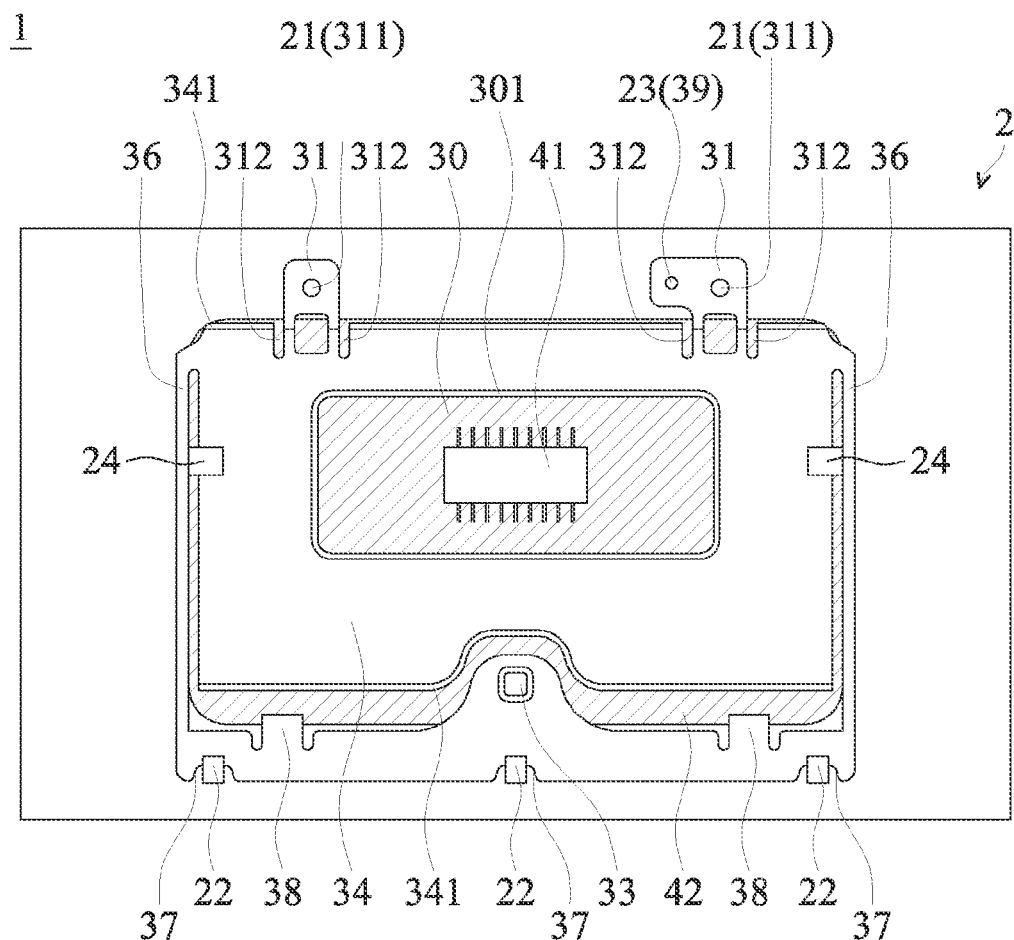
FIG. 5B is a schematic view showing the touch module after assembly according to another embodiment of the invention.

Referring to FIGS. 5A and 5B, the frame 2 in another embodiment of the present invention has a pair of stoppers 24 extending along a direction perpendicular to the flexible arms 36 and toward a hollow of the frame 2. When an external force is applied to the plate portion 42 of the touch unit 4, the main body 34 is moved and pushes the protrusion 40 contacting the contact portion 33. When an excessive force is applied, the stopper 24 can contact the main body 34 to restrict the movement of the main body 34, such that the damage of the extending portions 31 or the flexible arms 36 caused by excessive deformation can be prevented.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A touch module, comprising:
a hollow frame;
a positioning member, comprising:
a main body;
an extending portion, connected to the main body and fixed to the frame;
a U-shaped structure, connected to the frame and the main body, wherein a U-shaped gap is formed between the U-shaped structure and the main body, the U-shaped structure and the U-shaped gap are oriented toward the same direction, and the U-shaped structure includes a contact portion and a pair of flexible arms, wherein the flexible arms are connected to the main body, the contact portion and the extending portion are disposed on opposite sides of the main body, and the contact portion is disposed between the flexible arms;
a touch unit comprising an electronic element disposed in an opening formed on the main body, connected to the main body and forming a protrusion, wherein when an external force is applied to the touch unit, the protrusion contacts the contact portion; and
two extending portions with a hole formed in each extending portion, and the opening is disposed between the holes.

2. The touch module as claimed in claim 1, wherein the positioning member is integrally formed in one piece by punching.

3. The touch module as claimed in claim 1, wherein the positioning member further comprises a first rib surrounding the opening.

4. The touch module as claimed in claim 3, wherein the main body comprises a second rib formed at an edge thereof, and the second rib is substantially perpendicular to the flexible arms.

5. The touch module as claimed in claim 1, wherein two notches are formed on opposite sides of the extending portion and between the extending portion and the main body.

6. The touch module as claimed in claim 1, wherein the U-shaped structure forms a recess engaged with the frame.

7. The touch module as claimed in claim 6, wherein the extending portion forms a through hole, and the frame forms a rod, engaged with the through hole.

8. The touch module as claimed in claim 1, wherein the extending portion has a Z-shaped structure.

9. The touch module as claimed in claim 1, wherein the frame forms a stopper contacting the main body when an external force is applied to the touch unit.

10. The touch module as claimed in claim 1, wherein the U-shaped structure further comprises a restricting portion, and the touch unit further comprises a plate portion, wherein when an external force is applied to the touch unit, the restricting portion contacts the plate portion.

* * * * *